US012169383B2

(12) United States Patent
Tomikawa

(10) Patent No.: US 12,169,383 B2
(45) Date of Patent: Dec. 17, 2024

(54) IMAGE FORMING APPARATUS

(71) Applicant: CANON KABUSHIKI KAISHA, Tokyo (JP)

(72) Inventor: Yohei Tomikawa, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/147,922

(22) Filed: Dec. 29, 2022

(65) Prior Publication Data

US 2023/0259063 A1 Aug. 17, 2023

(30) Foreign Application Priority Data

Jan. 27, 2022 (JP) ................................ 2022-011176

(51) Int. Cl.
*G03G 21/16* (2006.01)
*G03G 15/00* (2006.01)

(52) U.S. Cl.
CPC ..... *G03G 21/1633* (2013.01); *G03G 15/5016* (2013.01); *G03G 15/6529* (2013.01); *G03G 15/70* (2013.01)

(58) Field of Classification Search
CPC ............... G03G 21/16; G03G 21/1619; G03G 21/1623; G03G 21/1633; G03G 21/1638; G03G 21/1685; G03G 21/1695; G03G 15/70; G03G 15/5016; G03G 15/6529
See application file for complete search history.

(56) References Cited

U.S. PATENT DOCUMENTS 10,167,166 B2 1/2019 Kakitani
2018/0009625 A1* 1/2018 Kakitani ................ B65H 43/04
2021/0286308 A1* 9/2021 Ishikawa ................ G03G 15/80

FOREIGN PATENT DOCUMENTS

JP 2018005182 A 1/2018

* cited by examiner

*Primary Examiner* — Thomas S Giampaolo, II
(74) *Attorney, Agent, or Firm* — ROSSI, KIMMS & McDOWELL LLP

(57) ABSTRACT

An image forming apparatus configured to form an image on a sheet includes an apparatus body, a drawer unit configured to be pulled out from the apparatus body, a cover provided to be openable and closable on the apparatus body, the cover being movable to a closed position where the cover covers the drawer unit attached to the apparatus body and an open position where the drawer unit is exposed so as to be pulled out from the apparatus body, a restricting portion configured to transit to a restricted state in which the drawer unit is restricted from being pulled out from the apparatus body and an allowable state in which the drawer unit is allowed to be pulled out from the apparatus body, and a display portion provided in the drawer unit and configured to display a state of the restricting portion.

18 Claims, 7 Drawing Sheets

IMAGE FORMING APPARATUS

BACKGROUND OF THE INVENTION

Field of the Invention

The present invention relates to an image forming apparatus that forms an image on a sheet.

Description of the Related Art

There has hitherto been proposed an image forming apparatus in which a sheet conveyance apparatus as a drawer unit can be pulled out from an apparatus body (see Japanese Patent Application Laid-Open Publication No. 2018-005182). For example, in a state in which a sheet straddles the sheet conveyance apparatus and a reversing portion of an apparatus body, there is a possibility that the sheet pulled out from the apparatus body by the sheet conveyance apparatus may be broken and the apparatus may be damaged. Therefore, this image forming apparatus is provided with a lock unit that sets a front door in a locked state when the sheet is in a state of straddling between the sheet conveyance apparatus and the reversing portion. Further, the front door is provided with a lock display for displaying the locked state of the front door when the front door is locked by the lock unit.

However, in the image forming apparatus described in Japanese Patent Application Laid-Open Publication No. 2018-005182, since the lock display is provided on the front door, it is difficult to understand a processing procedure for a jammed sheet. For example, in a state in which a sheet straddles between the sheet conveyance apparatus and the reversing portion, a key mark is lighted by an LED in the lock display. Even when a user views the lighted lock display on the front door, it is difficult for the user to recognize from which part of the image forming apparatus the jam handling should be performed, and there is a problem in the jam handling performance.

SUMMARY OF THE INVENTION

According to an aspect of the present invention, an image forming apparatus configured to form an image on a sheet includes an apparatus body, a drawer unit configured to be pulled out from the apparatus body, a cover provided to be openable and closable on the apparatus body, the cover being movable to a closed position where the cover covers the drawer unit attached to the apparatus body and an open position where the drawer unit is exposed so as to be pulled out from the apparatus body, a restricting portion configured to transit to a restricted state in which the drawer unit is restricted from being pulled out from the apparatus body and an allowable state in which the drawer unit is allowed to be pulled out from the apparatus body, and a display portion provided in the drawer unit and configured to display a state of the restricting portion.

Further features of the present invention will become apparent from the following description of exemplary embodiments with reference to the attached drawings.

DESCRIPTION OF THE EMBODIMENTS

Overall Configuration

Figure 1:
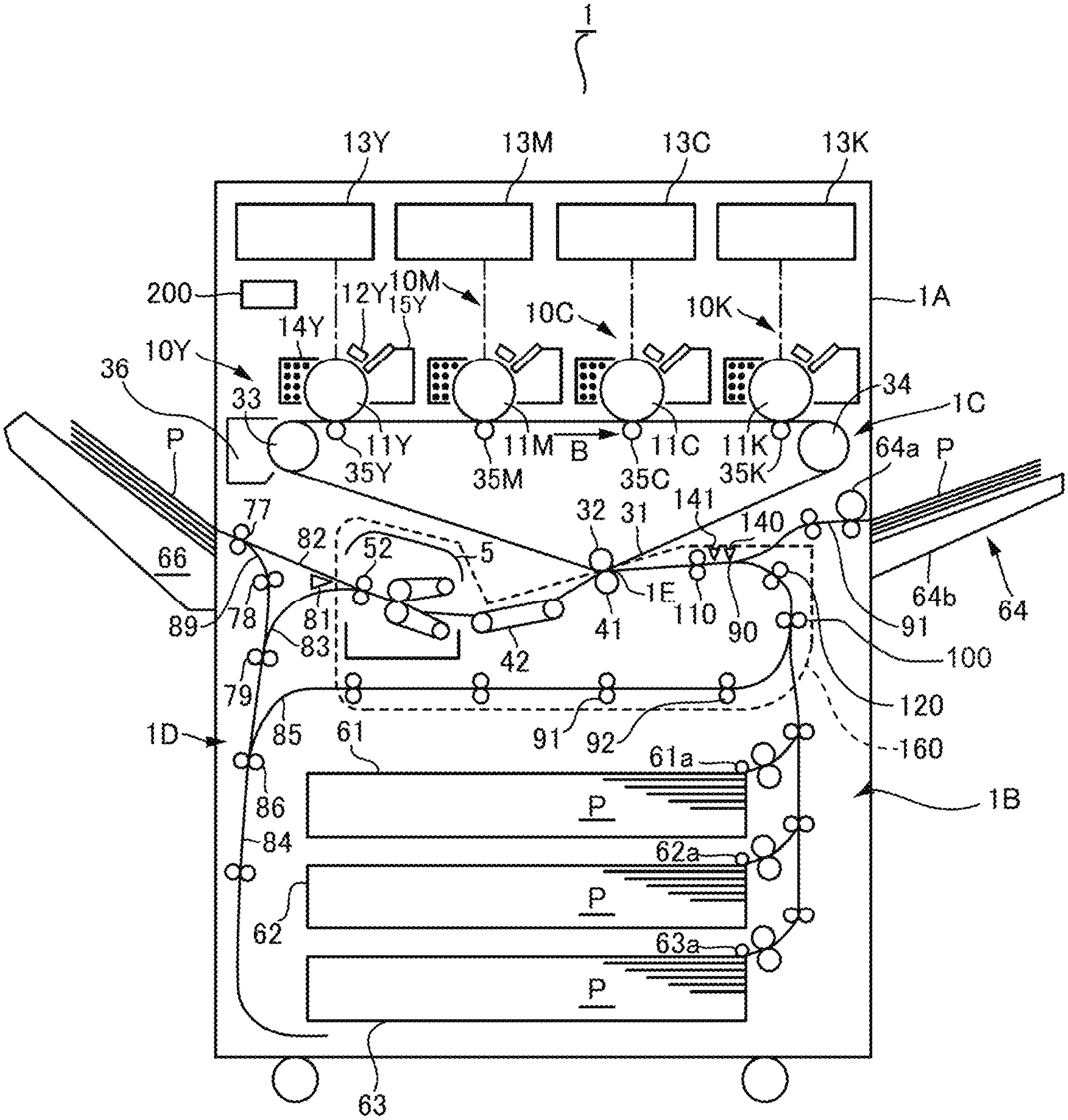
FIG. 1 is an overall schematic view illustrating a printer according to an embodiment.

A printer 1 as an image forming apparatus according to the present embodiment is an electrophotographic laser beam printer. As illustrated in FIG. 1, the printer 1 includes a cassette feeding unit 1B, a manual feeding unit 64, an image forming unit 1C, an intermediate transfer belt 31, a duplex conveyance unit 1D, and a control unit 200. The control unit 200 includes a CPU, a ROM that stores various programs, and a RAM used as a work area of the CPU.

When an image forming command is output to the printer 1, an image forming process by the image forming unit 1C is started based on image information input from an external computer or the like connected to the printer 1. The image forming unit 1C includes four exposing units 13Y, 13M, 13C, and 13K, and four process cartridges 10Y, 10M, 10C, and 10K that form images of four colors of yellow (Y), magenta (M), cyan (C), and black (K). Note that the four process cartridges 10Y, 10M, 10C, and 10K have the same configuration except that colors of images to be formed are different, only the image forming process of the process cartridge 10Y will be described, and the description of the process cartridges 10M, 10C, and 10K will be omitted.

The exposing unit 13Y irradiates a photosensitive drum 11Y of the process cartridge 10Y with laser light on the basis of the input image information. In this case, the photosensitive drum 11Y is charged in advance by a charger 12Y, and an electrostatic latent image is formed on the photosensitive drum 11Y by irradiating the photosensitive drum 11Y with the laser light. Thereafter, the electrostatic latent image is developed by a developing unit 14Y, and a toner image of yellow (Y) is formed on the photosensitive drum 11Y. Toner remaining on the photosensitive drum 11Y after the toner image is transferred to the intermediate transfer belt 31 is collected by a cleaner 15Y.

Similarly, toner images of magenta (M), cyan (C), and black (K) are also formed on photosensitive drums 11M, 11C, and 11K of the process cartridges 10M, 10C, and 10K, respectively. The toner image of each color formed on each photosensitive drum is transferred to the intermediate transfer belt 31 by primary transfer rollers 35Y, 35M, 35C, and 35K, and is conveyed to a secondary transfer inner roller 32 by the rotating intermediate transfer belt 31. The image forming process is performed on each color at the timing of superimposing the toner image on the upstream toner image primarily transferred onto the intermediate transfer belt 31. The intermediate transfer belt 31 is stretched by a driving roller 33, a tension roller 34, and the secondary transfer inner roller 32, and rotates in the direction of arrow B.

In parallel with the above-described image forming process, a sheet P is fed from the cassette feeding unit 1B or the manual feeding unit 64. The cassette feeding unit 1B includes a plurality of cassettes 61, 62, and 63 (three cassettes in the present embodiment), and sheets P are fed from these cassettes 61, 62, and 63 by pickup rollers 61*a*, 62*a*, and 63*a*, respectively. The manual feeding unit 64 includes a manual feed tray 64*b* rotatably supported, and a sheet P stacked on the manual feed tray 64*b* is fed by a pickup roller 64*a*

The skews of the sheets P fed from the pickup rollers 61*a*, 62*a*, 63*a*, and 64*a* are corrected by a conveyance roller pair 120, a registration roller pair 110, and the like. Predetermined pressure and electrostatic bias are applied to the first surface of a sheet P conveyed by the registration roller pair 110 in a transfer nip 1E as a transfer portion formed by the secondary transfer inner roller 32 and a secondary transfer outer roller 41. As a result, a full-color toner image on the intermediate transfer belt 31 is transferred to the first surface of the sheet P. Residual toner remaining on the intermediate transfer belt 31 is collected by a cleaner 36.

The sheet P to which the toner image has been transferred is conveyed to a fixing unit 5 by an air suction belt 42, and predetermined pressure and heat are applied to melt and fix the toner image. The sheet P that has passed through the fixing unit 5 is conveyed by a fixing conveyance roller pair 52 to a discharge conveyance path 82 in a case where the sheet P is discharged as it is onto a sheet discharge tray 66, and to a reverse guide path 83 in a case where images are formed on both sides of the sheet P.

A guide member 81 is rotatably provided at a branch portion between the discharge conveyance path 82 and the reverse guide path 83. The guide member 81 switches between the paths according to a discharge mode in which the sheet P is discharged onto the sheet discharge tray 66, a reverse discharge mode in which the sheet P is reversed and discharged, or a re-conveyance mode in which the sheet P is conveyed again to the image forming unit 1C. By switching between the paths by the guide member 81, the sheet is guided to the discharge conveyance path 82 or the reverse guide path 83 according to the set mode.

For example, in the discharge mode, the guide member 81 rotates downward and moves to a discharge position where the sheet is guided to be discharged. As a result, the sheet P conveyed by the fixing conveyance roller pair 52 is conveyed to the discharge conveyance path 82 along the upper surface of the guide member 81, and is discharged to the sheet discharge tray 66 by a sheet discharge roller pair 77.

In the re-conveyance mode, the guide member 81 rotates upward and moves to a retracted position where the sheet is guided to the reverse guide path 83. As a result, the sheet P conveyed by the fixing conveyance roller pair 52 is guided to the reverse guide path 83 along the lower surface of the guide member 81, and is drawn into a switchback path 84 by a first reverse conveyance roller pair 79. Then, the leading and trailing edges and the front and back sides of the sheet P are switched by a switchback operation of normally and reversely rotating a second reverse conveyance roller pair 86, and the sheet P is conveyed to a duplex conveyance path 85. Thereafter, the sheet P conveyed to the duplex conveyance path 85 is sent to the transfer nip 1E. A duplex conveyance unit 1D includes the reverse guide path 83, the switchback path 84, the duplex conveyance path 85, the first reverse conveyance roller pair 79, the second reverse conveyance roller pair 86, and other conveyance roller pairs. The subsequent image forming process for the back surface (second surface) is similar to the above-described image forming process for the front surface (first surface).

Also in the reverse discharge mode, the guide member 81 rotates upward and moves to the retracted position. As a result, the sheet P is conveyed to the reverse guide path 83 by the fixing conveyance roller pair 52, and is drawn into the switchback path 84 by the first reverse conveyance roller pair 79. Then, the leading and trailing edges of the sheet Pare switched by a switchback operation of normally and reversely rotating the first reverse conveyance roller pair 79, and the sheet P is conveyed to a reverse conveyance path 89. Thereafter, the sheet P is conveyed to the sheet discharge roller pair 77 by a reverse conveyance roller pair 78 provided in the reverse conveyance path 89, and is discharged to the sheet discharge tray 66 by the sheet discharge roller pair 77.

The printer 1 according to the present embodiment includes an apparatus body 1A and a drawer unit 160 that can be pulled out from the apparatus body 1A. The cassettes 61, 62, and 63 are also configured to be able to be pulled out from the apparatus body 1A. The drawer unit 160 is located in a region surrounded by a broken line in FIG. 1, and includes, for example, a conveyance roller pair 100, the registration roller pair 110, the secondary transfer outer roller 41, the air suction belt 42, the fixing unit 5, and a part of the duplex conveyance path 85.

Configurations of Front Door and Drawer Unit

Next, configurations of the front door 150 and the drawer unit 160 of the printer 1 will be described with reference to FIGS. 2A to 5. Although an image reading apparatus 300 is not illustrated in FIG. 1, the printer 1 may or may not include the image reading apparatus 300 that reads an image of a document. Since the configuration of the image reading apparatus 300 is publicly known, the description thereof will be omitted.

Figure 2B:
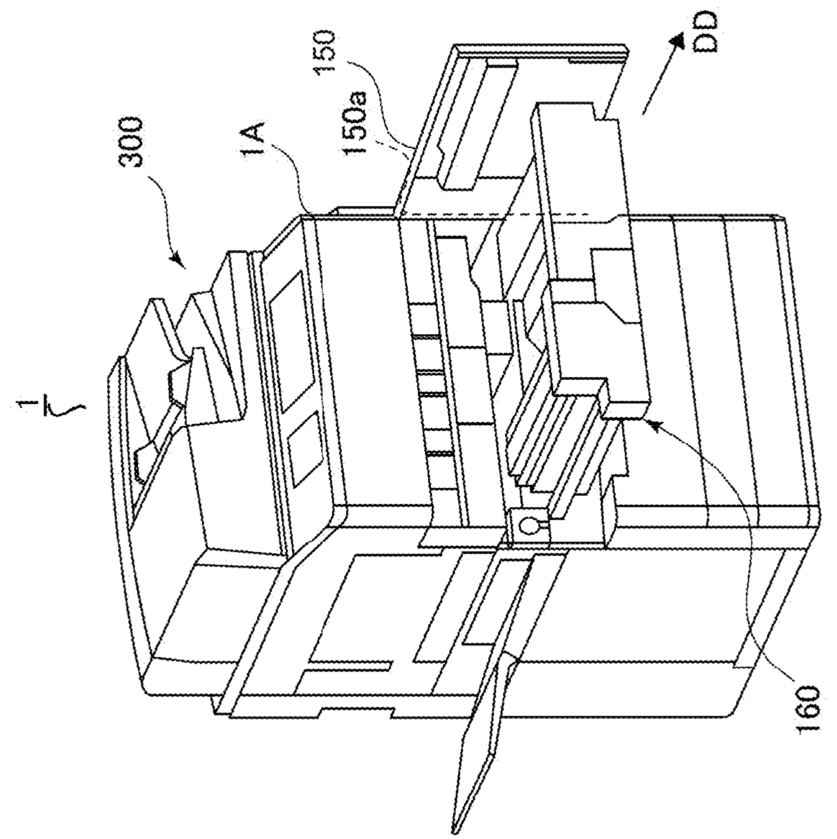
FIG. 2B is a perspective view illustrating the printer in a state in which a drawer unit is pulled out.
Figure 2A:
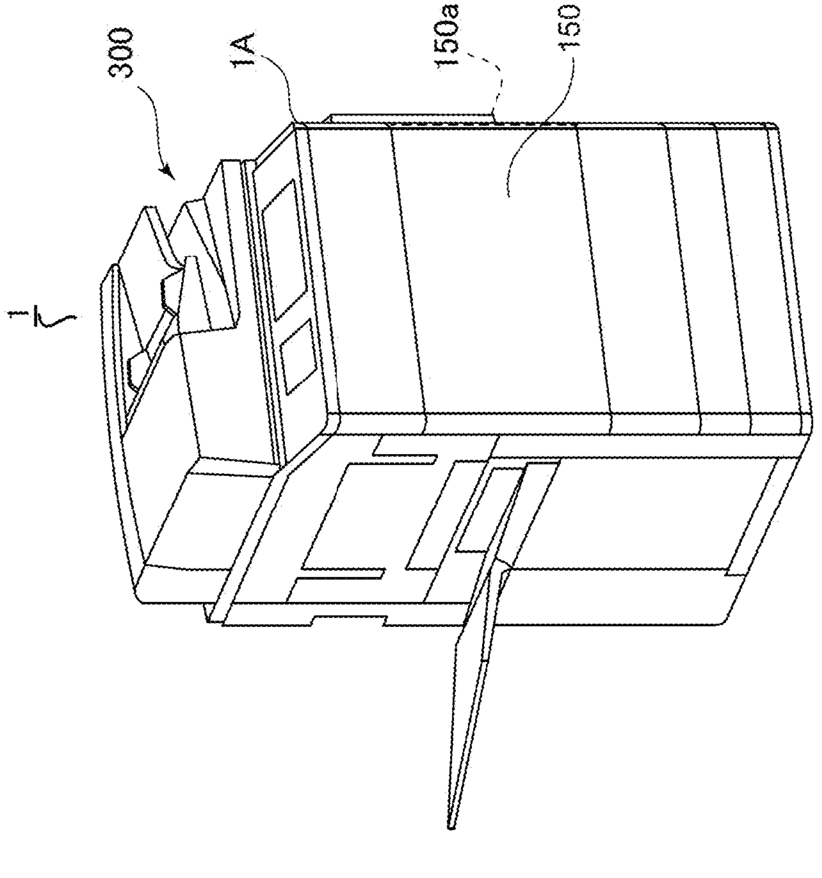
FIG. 2A is a perspective view illustrating the printer.

As illustrated in FIGS. 2A and 2B, the printer 1 is provided with the front door 150 disposed on the front side of the apparatus. The front door 150 as a cover is an exterior member that extends in the vertical direction and is supported to be openable and closable with respect to the apparatus body 1A around a shaft 150*a*, and constitutes an exterior of the printer 1. The front door 150 is movable to a closed position (FIG. 2A) where the front door 150 covers the drawer unit 160 attached to the apparatus body 1A, and an open position (FIG. 2A) where the drawer unit 160 is exposed so that the drawer unit 160 can be pulled out from the apparatus body 1A. The drawer unit 160 can be pulled out in a pull-out direction DD, that is, toward the front side of the apparatus in a state in which the front door 150 is located at the open position.

Figure 3A:
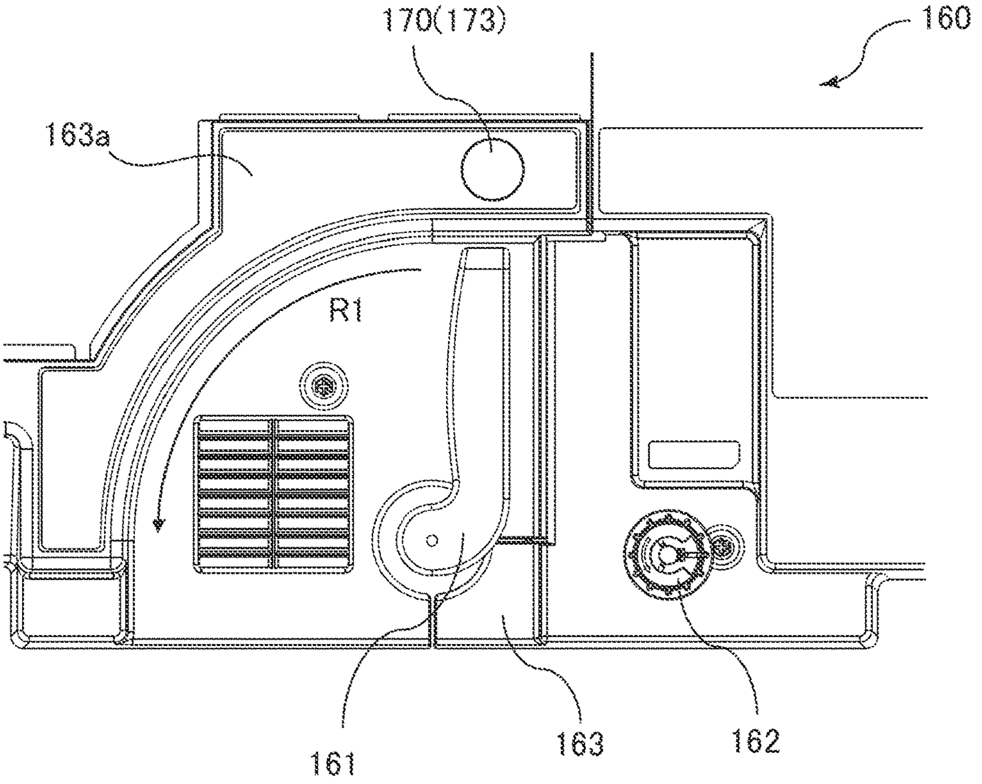
FIG. 3A is a front view illustrating the drawer unit in a state in which a handle is located at a locked position.
Figure 3B:
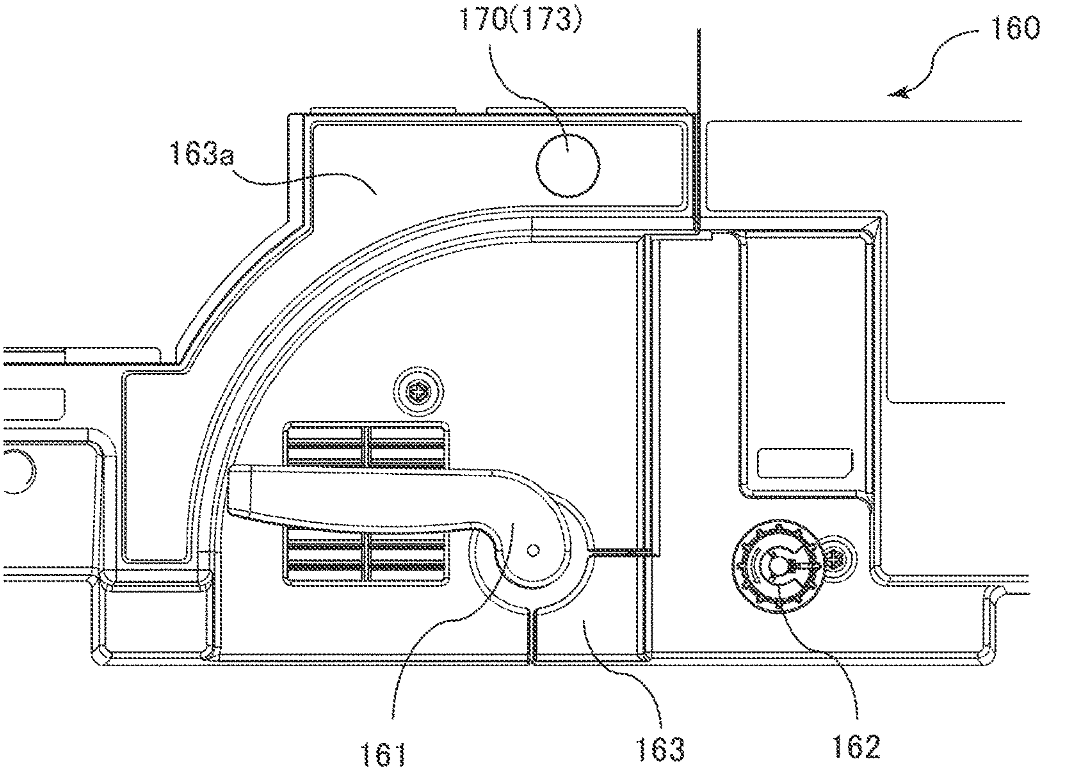
FIG. 3B is a front view illustrating the drawer unit in a state in which the handle is located at an unlocked position.
Figure 4A:
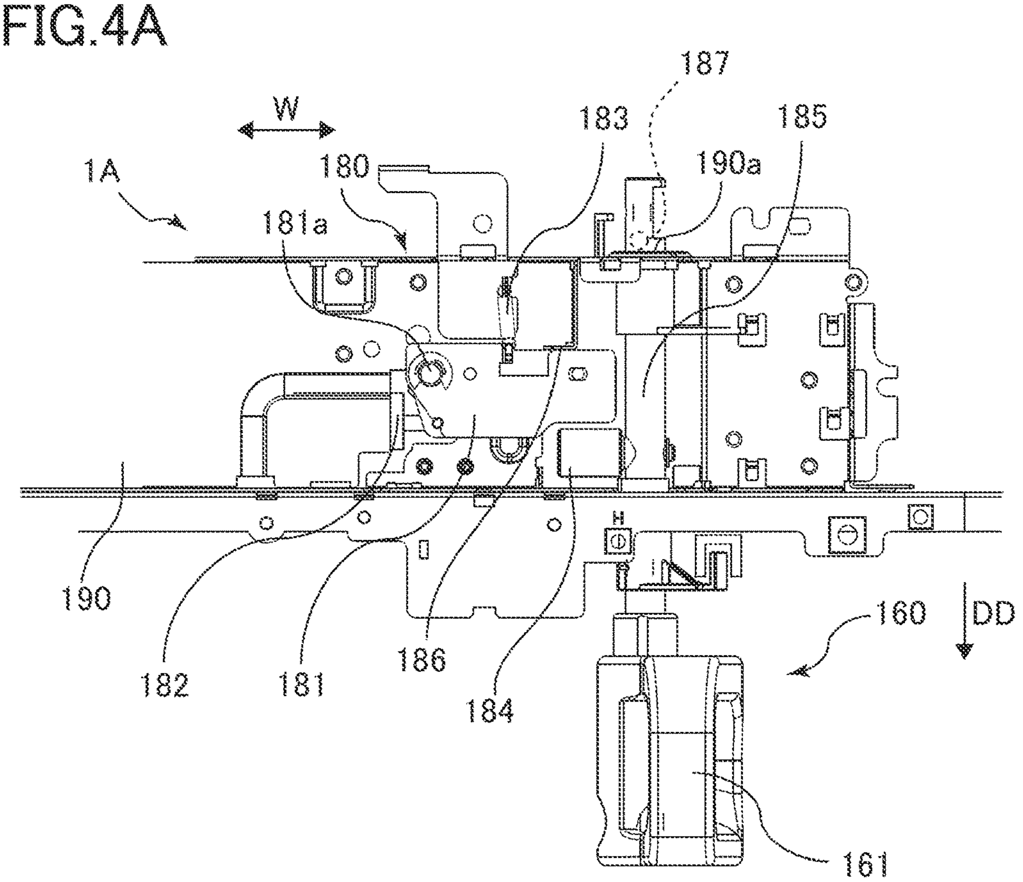
FIG. 4A is a plan view illustrating a lock unit in an allowable state.
Figure 4B:
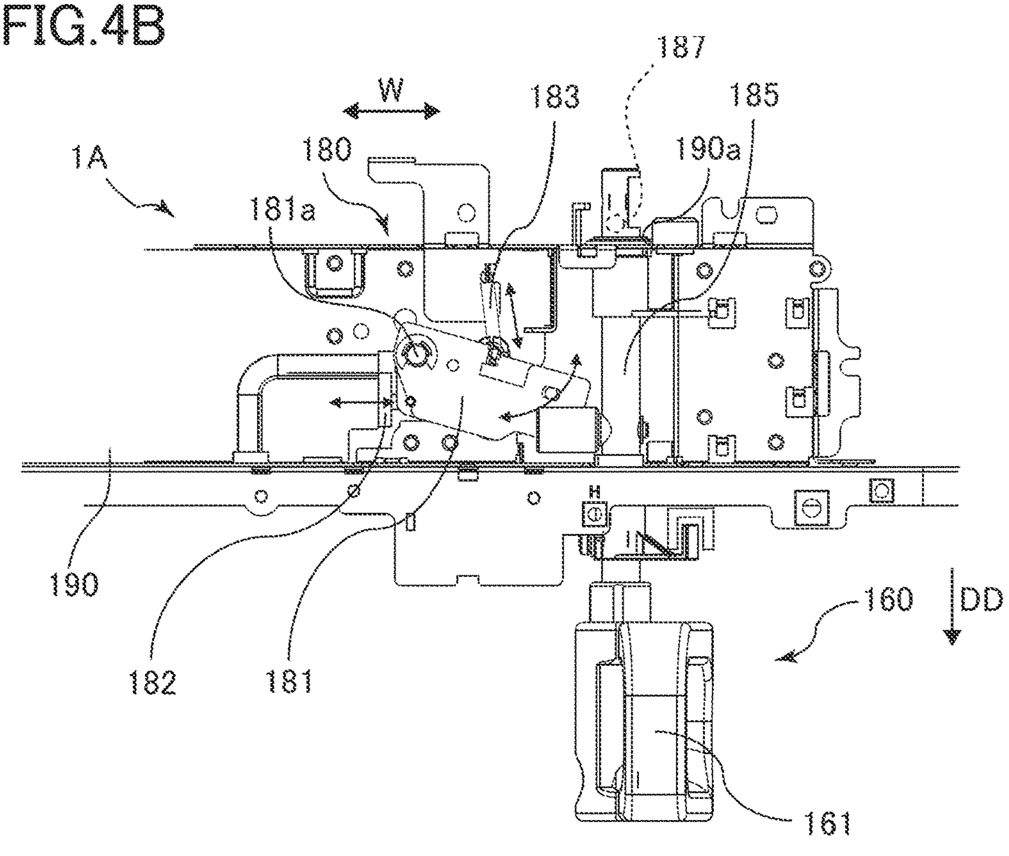
FIG. 4B is a plan view illustrating the lock unit in a restricted state.

FIGS. 3A and 3B are front views of the drawer unit 160 as viewed from upstream in the pull-out direction DD, that is, from the front side of the printer 1. FIGS. 4A and 4B are plan views illustrating a lock unit 180. As illustrated in FIGS. 3A and 3B, the drawer unit 160 includes a drawer cover 163, a handle 161, and a jam handling knob 162. The drawer cover 163 is provided on the front surface 163*a* side of the drawer unit 160, and the handle 161 and the jam handling knob 162 protrude from the drawer cover 163 toward the front surface side. That is, the handle 161 and the jam handling knob 162 are configured to be operable from the front surface 163*a* side of the drawer unit 160 in a state in which the front door 150 is opened.

The jam handling knob 162 as a conveyance operation portion is drivingly connected to conveyance roller pairs 91 and 92 of the duplex conveyance unit 1D illustrated in FIG.

1. The conveyance roller pairs 91 and 92 as conveyance rotary members are provided in the drawer unit 160. More specifically, the jam handling knob 162 is provided on the rotation shaft of the conveyance roller pair 91, and the conveyance roller pairs 91 and 92 are drivingly connected by a drive gear and a belt. Therefore, when the user manually rotates the jam handling knob 162, the conveyance roller pairs 91 and 92 in the drawer unit 160 rotate. As a result, the user can convey a jammed sheet in the drawer unit 160, and can send the sheet to a position where the user can easily pull out the sheet.

As illustrated in FIGS. 4A and 4B, the apparatus body 1A includes a front stay 190 which is a frame member and extends in a width direction W orthogonal to the pull-out direction DD, and the lock unit 180 provided on the front stay 190. The handle 161 provided in the drawer unit 160 is connected to a handle shaft 185, and the handle shaft 185 rotates in conjunction with the handle 161. The handle shaft 185 extends along the pull-out direction DD and is provided with a lock shaft 184 extending in the width direction W orthogonal to the pull-out direction DD and a protrusion 187. That is, the protrusion 187 as an engaging portion is connected to the handle 161 via the handle shaft 185.

The handle 161 is configured to be rotatable to a locked position illustrated in FIG. 3A and an unlocked position illustrated in FIG. 3B, and is rotated in the direction of arrow R1 in a state of being located at the locked position to move to the unlocked position. The user can pull out the drawer unit 160 from the apparatus body 1A in the pull-out direction DD by positioning the handle 161 at the unlocked position and pulling the handle 161 forward while holding the handle 161. In FIGS. 4A and 4B, the drawer unit 160 is attached to the apparatus body 1A, and the handle 161 is located at the locked position in both cases.

As illustrated in FIGS. 4A and 4B, when the handle 161 is located at the locked position, the protrusion 187 provided on the lock shaft 184 is disposed upstream of the front stay 190 in the pull-out direction DD and extends downward. In this state, when the drawer unit 160 is to be pulled out from the apparatus body 1A in the pull-out direction DD, the protrusion 187 butts against a side surface 190*a* of the front stay 190 as an engaged portion. Therefore, in a state in which the handle 161 is located at the locked position, the drawer unit 160 is restricted from being pulled out from the apparatus body 1A in the pull-out direction DD. In other words, the protrusion 187 can restrict the drawer unit 160 from being pulled out from the apparatus body 1A by engaging with the front stay 190.

On the other hand, when the handle 161 is rotated from the locked position in the direction of arrow R1 (see FIG. 3A) and is located at the unlocked position, the protrusion 187 retracts upward from the front stay 190. That is, the drawer unit 160 can be pulled out from the apparatus body 1A in the pull-out direction DD without the protrusion 187 interfering with the front stay 190. In other words, when the handle 161 is located at the unlocked position, the drawer unit 160 is allowed to be pulled out from the apparatus body 1A.

The lock unit 180 as a restricting portion includes a handle lock plate 181, a solenoid 182, and a tension spring 183. The handle lock plate 181 as a restricting member is rotatably supported by the front stay 190 about a rotation shaft 181*a* at an allowable position illustrated in FIG. 4A and a restricted position illustrated in FIG. 4B.

The handle lock plate 181 does not interfere with the movement trajectory of the lock shaft 184 at the allowable position when the handle 161 is rotated between the locked position and the unlocked position. In other words, the handle lock plate 181 allows the movement of the handle 161 from the locked position to the unlocked position at the allowable position. Further, the handle lock plate 181 overlaps the movement trajectory at the restricted position. That is, the handle lock plate 181 interferes with the lock shaft 184 at the restricted position when the handle 161 rotates from the locked position to the unlocked position. As a result, the rotation of the handle 161 from the locked position to the unlocked position is restricted.

When the handle 161 is located at the locked position, the lock shaft 184 is separated from the handle lock plate 181 located at the restricted position with a slight gap. This is because the handle lock plate 181 moves between the allowable position and the restricted position without interfering with the lock shaft 184. When the handle 161 is rotated from the locked position to the unlocked position, the lock shaft 184 quickly abuts against the handle lock plate 181, and the rotation of the handle 161 is restricted. Therefore, when the handle lock plate 181 is located at the restricted position, the pulling out of the drawer unit 160 from the apparatus body 1A is restricted.

Hereinafter, it is assumed that the lock unit 180 is in the restricted state when the handle lock plate 181 is located at the restricted position, and that the lock unit 180 is in the allowable state when the handle lock plate 181 is located at the allowable position. That is, the lock unit 180 can transition to the restricted state in which the drawer unit 160 is restricted from being pulled out from the apparatus body 1A and the allowable state in which the drawer unit 160 is allowed to be pulled out from the apparatus body 1A.

The handle lock plate 181 has an end urged toward the allowable position by the tension spring 183 supported by the front stay 190, and is positioned at the allowable position by abutting against a stopper 186 provided on the front stay 190. Further, the handle lock plate 181 is connected to the solenoid 182 as an actuator, and when the solenoid 182 is energized and operated, the handle lock plate 181 is moved from the allowable position to the restricted position against the urging force of the tension spring 183 as an urging portion. Instead of the tension spring 183, another spring such as a leaf spring or a torsion bar may be used.

Figure 5A:
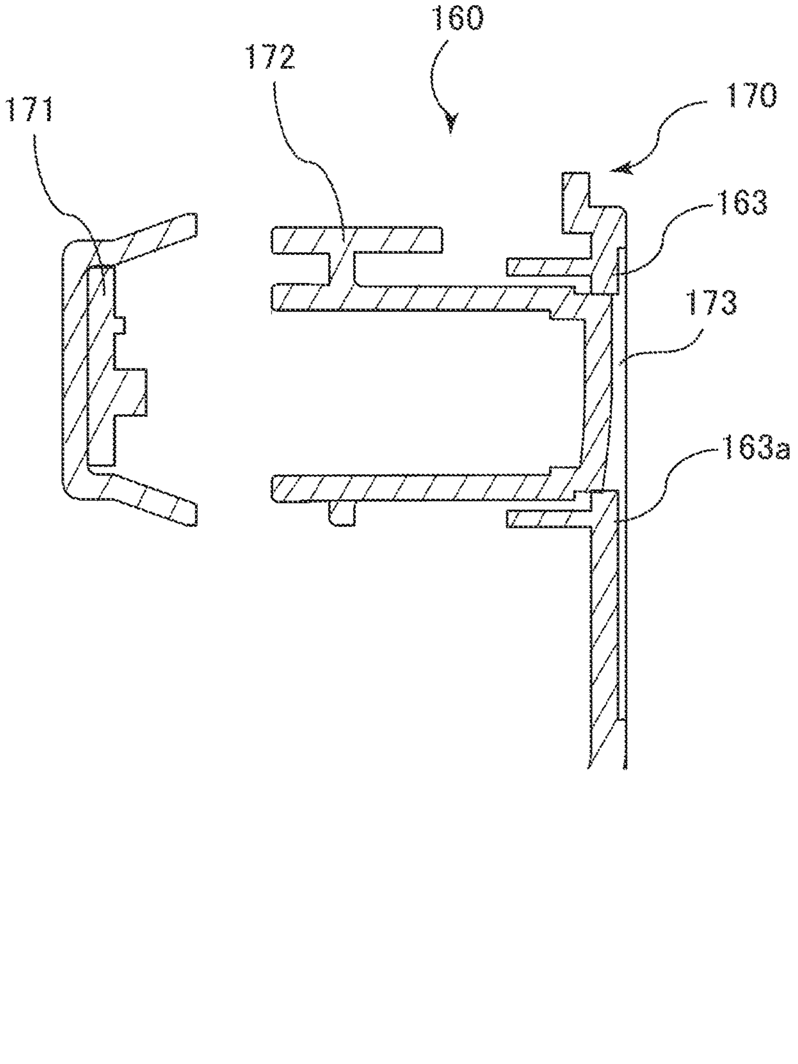
FIG. 5A is a cross-sectional view illustrating a lock display unit provided in the drawer unit.
Figure 5B:
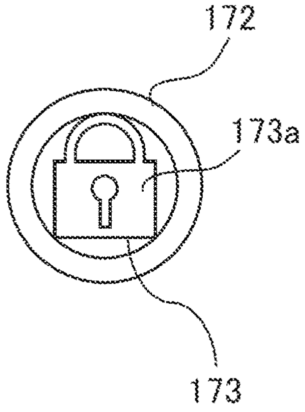
FIG. 5B is a front view illustrating a display portion.

FIG. 5A is a cross-sectional view of the drawer unit 160 on a plane parallel to the pull-out direction DD and the vertical direction. FIG. 5B is a front view illustrating a display portion 173. As illustrated in FIG. 5A, the drawer unit 160 includes a lock display unit 170, and the lock display unit 170 includes an LED 171, a light condensing portion 172, and the display portion 173 for displaying the state of the lock unit 180.

The display portion 173 is provided on the front surface 163*a* of the drawer cover 163. That is, as illustrated in FIG. 3A, the handle 161 and the display portion 173 are provided downstream in the pull-out direction DD of the drawer unit 160, that is, on the front surface side. The LED 171 as a light source is supported by the drawer cover 163 and is disposed at a position facing the display portion 173 in the pull-out direction DD. The light condensing portion 172 is disposed between the LED 171 and the display portion 173 in the pull-out direction DD, and efficiently condenses light emitted from the LED 171 on the display portion 173. In other words, the LED 171 can illuminate the display portion 173.

The light condensing portion 172 is formed in a cylindrical shape so as to surround the entire circumference of the display portion 173. The inner peripheral surface of the light condensing portion 172 is formed with a highly reflective color, and specifically, the color is desirably white. When the LED 171 is turned on, light emitted from the LED 171 is condensed on the display portion 173 by the inner peripheral surface of the light condensing portion 172. As illustrated in FIG. 5B, the display portion 173 has, for example, a key mark 173*a*, and is made of a material capable of transmitting light emitted from the LED 171. The display portion 173 is illuminated by the LED 171, so that the user can clearly visually recognize the mark 173*a* of the display portion 173. The light condensing portion 172 may be a lens or the like.

Locking Process

Figure 6:
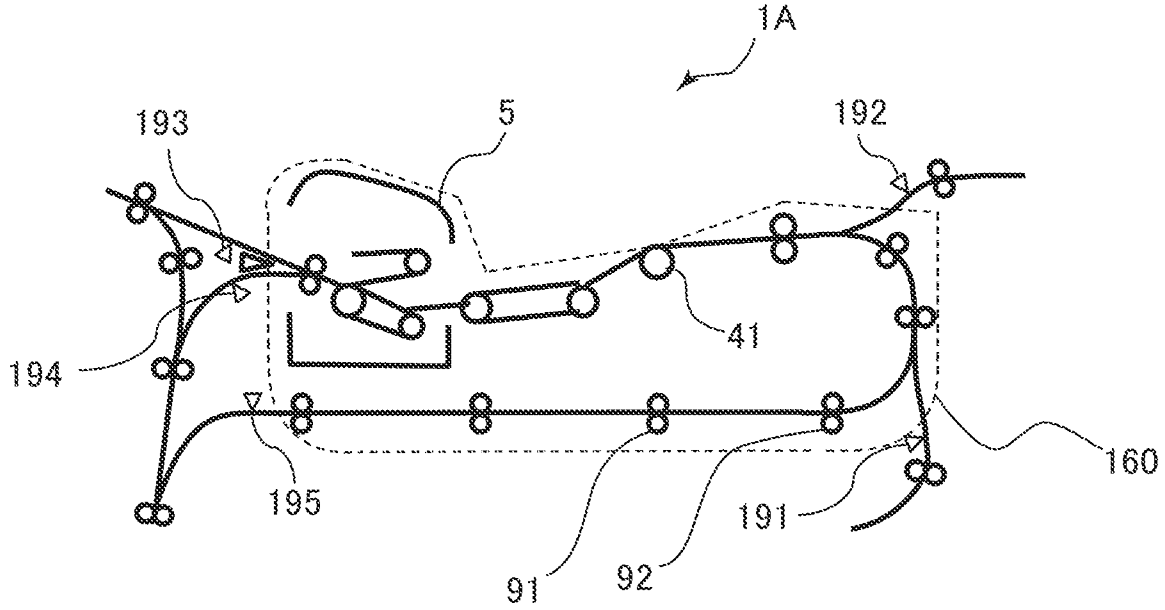
FIG. 6 is a schematic view illustrating sensors provided around the drawer unit.
Figure 7:
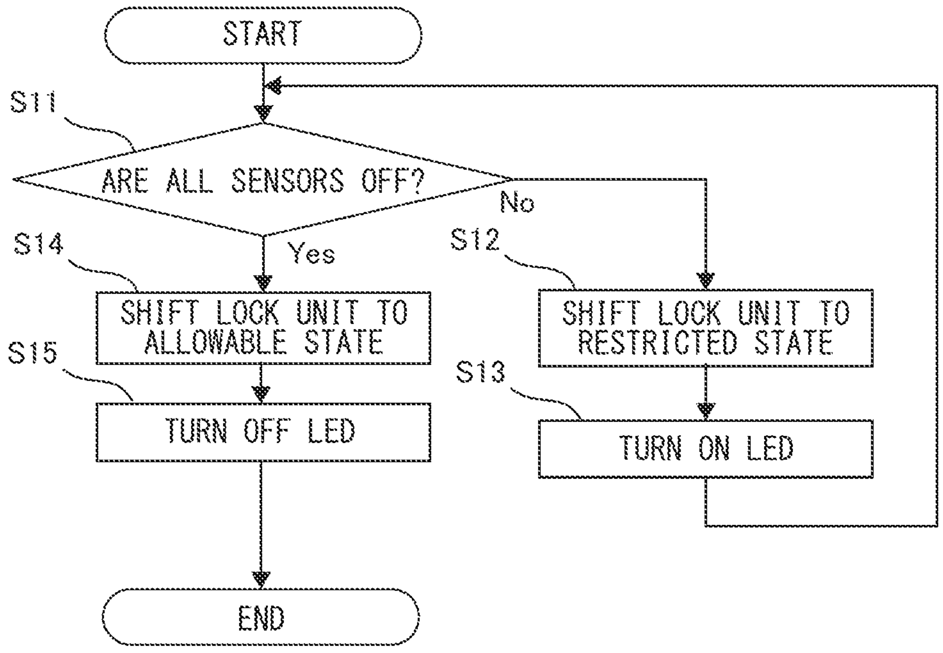
FIG. 7 is a flowchart illustrating a locking process.

Next, a locking process of locking the drawer unit 160 such that the drawer unit 160 is not pulled out from the apparatus body 1A will be described. FIG. 6 is a schematic view illustrating sensors provided around the drawer unit 160. FIG. 7 is a flowchart illustrating the locking process.

As illustrated in FIG. 7, when the locking process is started, the control unit 200 of the printer 1 determines whether or not all sensors 191 to 195 are OFF (step S11). As illustrated in FIG. 6, the sensors 191 to 195 are provided near a boundary between the drawer unit 160 and the apparatus body 1A on the apparatus body 1A side. Each of the sensors 191 to 195 can detect the presence or absence of the sheet at a detection position, is turned on when the sheet is at the detection position, and is turned off when the sheet is not at the detection position. In other words, each of the sensors 191 to 195 detects the position of the sheet.

Since the sensors 191 to 195 are provided near the boundary between the drawer unit 160 and the apparatus body 1A, the control unit 200 can detect that the sheet is jammed across the drawer unit 160 and the apparatus body 1A based on the detection results of the sensors 191 to 195. When all the sensors 191 to 195 are OFF, it means that the sheet is not jammed across the drawer unit 160 and the apparatus body 1A.

As illustrated in FIG. 7, when at least any one of the sensors 191 to 195 is ON (step S11: No), the control unit 200 energizes the solenoid 182 to shift the lock unit 180 to the restricted state (step S12). As a result, the handle lock plate 181 moves from the allowable position to the restricted position, and the rotation of the handle 161 is restricted. In addition, the control unit 200 turns on the LED 171 to illuminate the display portion 173 (step S13). As a result, the user can visually recognize the display portion 173 of the key mark and recognize that the pulling out of the drawer unit 160 from the apparatus body 1A is restricted. Then, the control unit 200 returns the process to step S11. That is, as long as at least any one of the sensors 191 to 195 is ON, the lock unit 180 maintains the restricted state. The front door 150 is configured to be openable and closable with respect to the apparatus body 1A regardless of whether the lock unit 180 is in the restricted state or the allowable state. In step S13, the LED 171 may be turned on continuously or may be turned on intermittently, that is, may blink.

If all the sensors 191 to 195 are OFF in step S11 (step S11: Yes), the control unit 200 cancels the energization of the solenoid 182 and shifts the lock unit 180 to the allowable state (step S14). Next, the control unit 200 turns off the LED 171 (step S15). When the lock unit 180 is already in the allowable state in step S11, the control unit 200 maintains the allowable state of the lock unit 180 and the OFF state of the LED 171. Thus, the locking process ends.

The locking process is executed at predetermined time intervals in a state in which the printer 1 is powered on. An opening/closing detection sensor that detects the opening and closing of the front door 150 of the printer 1 may be provided, and the locking process may be executed only in a state in which the opening/closing detection sensor detects that the front door 150 is opened.

As described above, in the printer 1 of the present embodiment, when the sheet is jammed across the drawer unit 160 and the apparatus body 1A, the lock unit 180 is in the restricted state. Therefore, the handle 161 of the drawer unit 160 is restricted from being rotated to the unlocked position, and the drawer unit 160 is restricted from being pulled out from the apparatus body 1A. As a result, it is possible to reduce breakage of the sheet retained (stopped) across the drawer unit 160 and the apparatus body 1A and breakage of the drawer unit 160 and the apparatus body 1A.

When the lock unit 180 is in the restricted state, the LED 171 is turned on, and the display portion 173 is illuminated by the LED 171. As a result, when the user opens the front door 150, the user can visually recognize the illuminated display portion 173, and can recognize that the lock unit 180 is in the restricted state.

Since the display portion 173 is exposed when the front door 150 is opened, the display portion 173 cannot be visually recognized when the front door 150 is closed. Therefore, the user is less likely to erroneously recognize the jam handling procedure due to the display portion 173. In addition, since the display portion 173 is provided on the front surface 163*a* side of the drawer unit 160 similarly to the handle 161, the user can intuitively recognize that the handle 161 is not rotatable by visually recognizing the illuminated display portion 173. Thus, the jam handling performance can be improved.

The front door 150 is configured to be openable and closable with respect to the apparatus body 1A regardless of whether the lock unit 180 is in the restricted state or the allowable state. Therefore, even if the sheet is jammed across the drawer unit 160 and the apparatus body 1A, the front door 150 can be opened to access the jam handling knob 162. By turning the jam handling knob 162, the conveyance roller pairs 91 and 92 can be manually rotated, and the state in which the sheet straddles the drawer unit 160 and the apparatus body 1A can be eliminated. When all the sensors 191 to 195 are turned off, the lock unit 180 is in the allowable state, and the drawer unit 160 can be pulled out from the apparatus body 1A. As a result, the jammed sheet can be handled in a state in which the drawer unit 160 is pulled out, and the jam handling performance can be improved.

Other Embodiments

In the present embodiment, the sensor 191 to 195 are provided near the boundary between drawer unit 160 and the apparatus body 1A on the apparatus body 1A side, but the present disclosure is not limited thereto. For example, the sensors 191 to 195 may be provided on the drawer unit 160 side near the boundary between the drawer unit 160 and the apparatus body 1A. The number and configuration of the sensors are not limited.

In the present embodiment, the lock unit 180 is provided on the front stay 190 of the apparatus body 1A, but the present disclosure is not limited thereto. For example, the lock unit 180 may be provided in the drawer unit 160. Further, the configuration of the lock unit 180 is not limited to the configuration of the above-described embodiment. For example, instead of restricting the rotation of the handle 161, the lock unit 180 may restrict the movement of a portion other than the handle 161 of the drawer unit 160 in the pull-out direction DD.

In the present embodiment, the handle lock plate 181 is configured to be moved from the allowable position to the restricted position by the solenoid 182, but the present disclosure is not limited thereto. For example, a motor or the like may be used instead of the solenoid 182. Further, the handle lock plate 181 may be moved from the allowable position to the restricted position via a mechanical link mechanism by a sheet that stops across the drawer unit 160 and the apparatus body 1A.

In addition, in the present embodiment, the display portion 173 is illuminated by the LED 171, but the present disclosure is not limited thereto. For example, instead of the LED 171, an incandescent lamp or a fluorescent lamp may be used, and a light source such as the LED 171 and the display portion 173 may be integrally provided.

In addition, in the present embodiment, the display portion 173 has the key mark 173*a*, but the present invention is not limited thereto. For example, it may be displayed that the drawer unit 160 is locked to the apparatus body 1A by a character such as "locked". When the lock unit 180 is in the allowable state, the display portion 173 may display that the drawer unit 160 is not locked to the apparatus body 1A with a mark indicating that a key is unlocked or a character such as "unlocked".

In the present embodiment, the electrophotographic printer 1 has been described, but the present invention is not limited thereto. For example, the present invention can also be applied to an inkjet type image forming apparatus that forms an image on a sheet by ejecting ink liquid from a nozzle.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-011176, filed Jan. 27, 2022, which is hereby incorporated by reference herein in its entirety.

What is claimed is:

1. An image forming apparatus configured to form an image on a sheet, the image forming apparatus comprising:

an apparatus body;

a drawer unit configured to be pulled out from the apparatus body;

a cover provided to be openable and closable on the apparatus body, the cover being movable to a closed position where the cover covers the drawer unit attached to the apparatus body and an open position where the drawer unit is exposed so as to be pulled out from the apparatus body; and a lock mechanism, wherein the drawer unit includes:

a handle mechanism configured to be rotatable around a rotational axis to a locked position where the drawer unit is restricted from being pulled out from the apparatus body, and an unlocked position where the drawer unit is allowed to be pulled out from the apparatus body, the lock mechanism configured to transit to a restricted state in which a pivot of the handle mechanism from the locked position to the unlocked position is restricted and to an allowable state in which the pivot of the handle mechanism from the locked position to the unlocked position is allowed, and a display configured to display a state of the lock mechanism, wherein the display is in a first state in a case where the lock mechanism is in the restricted state, and is in a second state that is different than the first state in a case where the lock mechanism is in the allowable state, the display in the first state being exposed to outside of the image forming apparatus in a case where the cover is moved from the closed position to the open position, the handle mechanism includes an end portion that is furthest from the rotational axis when viewed in a direction of the rotational axis, and the display is closer to the end portion of the handle mechanism in the locked position than to the end portion of the handle mechanism in the unlocked position.

2. The image forming apparatus according to claim 1, wherein the cover is openable and closable with respect to the apparatus body regardless of whether the lock mechanism is in the restricted state or the allowable state.

3. The image forming apparatus according to claim 1, wherein the lock mechanism is in the restricted state in a case where the sheet is stopped in a state of straddling the apparatus body and the drawer unit.

4. The image forming apparatus according to claim 3, further comprising a sensor configured to detect a position of the sheet.

5. The image forming apparatus according to claim 4, further comprising a control unit configured to control the lock mechanism to be in the restricted state when determining that the sheet is stopped in a state of straddling the apparatus body and the drawer unit based on a detection result of the sensor.

6. The image forming apparatus according to claim 5, wherein the lock mechanism includes a locking device configured to move to a restricted position where the handle mechanism is restricted from moving from the locked position to the unlocked position and an allowable position where the handle mechanism is allowed to move from the locked position to the unlocked position, and an actuator configured to move the locking device from the allowable position to the restricted position, and the control unit drives the actuator such that the locking device is located at the restricted position when determining that the sheet is stopped in a state of straddling the apparatus body and the drawer unit based on the detection result of the sensor.

7. The image forming apparatus according to claim 6, wherein the lock mechanism includes an spring mechanism configured to urge the locking device to the allowable position, and the actuator is a solenoid configured to be energized to move the locking device from the allowable position to the restricted position against an urging force of the spring mechanism.

8. The image forming apparatus according to claim 6, wherein the drawer unit includes a surface disposed on a downstream end portion of the drawer unit in a pull-out direction in which the drawer unit is pulled out from the apparatus body, and wherein the display and the handle mechanism are provided on the surface.

9. The image forming apparatus according to claim 5, further comprising a light source configured to illuminate the display, wherein the control unit turns on the light source when determining that the sheet is stopped in a state of straddling the apparatus body and the drawer unit based on the detection result of the sensor.

10. The image forming apparatus according to claim 9, wherein the light source is turned on when the display is in the first state and is turned off when the display is in the second state.

11. The image forming apparatus according to claim 1, further comprising a light source configured to illuminate the display.

12. The image forming apparatus according to claim 11, wherein the drawer unit includes the light source and a light condensing portion configured to condense light emitted from the light source on the display.

13. The image forming apparatus according to claim 11, wherein the display has a mark to be illuminated by the light source and is configured to transmit light emitted from the light source.

14. The image forming apparatus according to claim 1, wherein the drawer unit includes a conveyance rotary member configured to convey the sheet, and a conveyance operation portion configured to rotate the conveyance rotary member, and the conveyance operation portion is operable in a state in which the cover is opened with respect to the apparatus body.

15. The image forming apparatus according to claim 1, wherein the cover constitutes an exterior member of the apparatus body.

16. The image forming apparatus according to claim 1, wherein the lock mechanism is provided in the apparatus body.

17. The image forming apparatus according to claim 1, wherein the drawer unit includes a fixing unit configured to fix, to the sheet, a toner image transferred to the sheet.

18. The image forming apparatus according to claim 1, wherein the direction of the rotational axis is parallel to a pull-out direction in which the drawer unit is pulled out from the apparatus body.

* * * * *